(12) United States Patent
Tan et al.

(10) Patent No.: US 11,436,164 B1
(45) Date of Patent: Sep. 6, 2022

(54) AUTOMATICALLY CONFIGURING SETTINGS BASED ON DETECTED LOCATIONS OF PERIPHERALS

(71) Applicant: Dell Products L.P., Round Rock, TX (US)

(72) Inventors: Danilo O. Tan, Austin, TX (US); Daniel L. Hamlin, Round Rock, TX (US); Harpreet Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/408,675

(22) Filed: Aug. 23, 2021

(51) Int. Cl.
| | | |
|---|---|---|
| *G06F 13/10* | (2006.01) | |
| *G06F 3/14* | (2006.01) | |
| *G06F 3/038* | (2013.01) | |
| *G06F 3/0354* | (2013.01) | |

(52) U.S. Cl.
CPC ............ *G06F 13/102* (2013.01); *G06F 3/038* (2013.01); *G06F 3/03543* (2013.01); *G06F 3/1423* (2013.01)

(58) Field of Classification Search
CPC ......... G06F 3/03543; G06F 2203/0332; G06F 3/0354; G06F 3/03541; G06F 13/102; G06F 3/038; G06F 3/1423; G06F 3/1446; G09G 2300/026; G09F 9/3026
USPC ................. 345/156, 157, 163, 1.1, 1.3, 903; 348/383
See application file for complete search history.

(56) References Cited

U.S. PATENT DOCUMENTS

| | | | | |
|---|---|---|---|---|
| 5,977,952 | A * | 11/1999 | Francis | G06F 3/03543 345/157 |
| 2012/0322367 | A1* | 12/2012 | Kee | H04B 17/23 455/41.1 |
| 2014/0125575 | A1* | 5/2014 | Samanta Singhar | G06F 3/038 345/156 |
| 2014/0256257 | A1* | 9/2014 | Thangella | G06F 3/038 455/41.2 |
| 2016/0210011 | A1* | 7/2016 | Ho | G06F 9/451 |
| 2018/0090054 | A1* | 3/2018 | Zhang | G09G 3/2096 |
| 2022/0137720 | A1* | 5/2022 | Wang | G06F 3/038 345/168 |

FOREIGN PATENT DOCUMENTS

WO    WO-2021208054 A1 * 10/2021

* cited by examiner

*Primary Examiner* — Koosha Sharifi-Tafreshi
(74) *Attorney, Agent, or Firm* — Kirton McConkie; Brian Tucker

(57) ABSTRACT

Settings of a computing device can be automatically configured based on detected locations of peripherals. A service on a computing device can be configured to detect the location of one or more peripherals relative to the computing device. Based on the relative location of the one or more peripherals, the service can automatically update one or more settings pertaining to the one or more peripherals to thereby automatically setup the user's workspace.

18 Claims, 3 Drawing Sheets

AUTOMATICALLY CONFIGURING SETTINGS BASED ON DETECTED LOCATIONS OF PERIPHERALS

CROSS-REFERENCE TO RELATED APPLICATIONS

N/A

BACKGROUND

Many companies have been transitioning to a hybrid workplace model in which employees have flexibility with regards to where and when they work. The Covid-19 pandemic has greatly expedited this transition. When a company provides a hybrid workplace, it can increase the difficulty of managing its employees' computing devices. For example, an employee may use his or her laptop to perform work in virtually any location and with a variety of peripherals. Even when its employees work in the office, the employees may sit in a different cubicle or workspace on any given day. If an employee does not know how to modify settings for a particular peripheral or set of peripherals, he or she may need to request the assistance of an IT administrator. Even if an employee knows how to modify such settings, it can be a tedious and time-consuming task, especially if the employee routinely works in different locations or workspaces and/or with different peripherals.

BRIEF SUMMARY

The present invention extends to systems, methods and computer program products for automatically configuring settings based on detected locations of peripherals. A service on a computing device can be configured to detect the location of one or more peripherals relative to the computing device. Based on the relative location of the one or more peripherals, the service can automatically update one or more settings pertaining to the one or more peripherals to thereby automatically setup the user's workspace.

In some embodiments, the present invention may be implemented as method for automatically configuring settings of a computing device based on a detected location of one or more peripherals. A service executing on the computing device can receive peripheral direction information. The service can then process the peripheral direction information to identify a first peripheral and a location of the first peripheral relative to the computing device. Based on the location of the first peripheral relative to the computing device, the service can automatically modify one or more settings of the first computing device that pertain to the first peripheral.

In some embodiments, the present invention may be implemented as computer storage media storing computer executable instructions which when executed implement a method for automatically configuring settings of a computing device based on a detected location of one or more peripherals. Peripheral direction information that was generated based on Bluetooth signals transmitted from or to a first peripheral can be processed to detect a location of the first peripheral relative to a computing device. Based on the detected location of the first peripheral relative to the computing device, one or more settings of the computing device pertaining to the first peripheral can be modified.

In some embodiments, the present invention may be implemented as a method for automatically configuring settings of a computing device based on a detected location of a plurality of peripherals. A service executing on the computing device can receive peripheral direction information pertaining to a plurality of peripherals. The service can process the peripheral direction information to identify a location of each of the plurality of peripherals relative to the computing device. Based on the location of each of the plurality of peripherals relative to the computing device, the service can automatically modify one or more settings of the computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
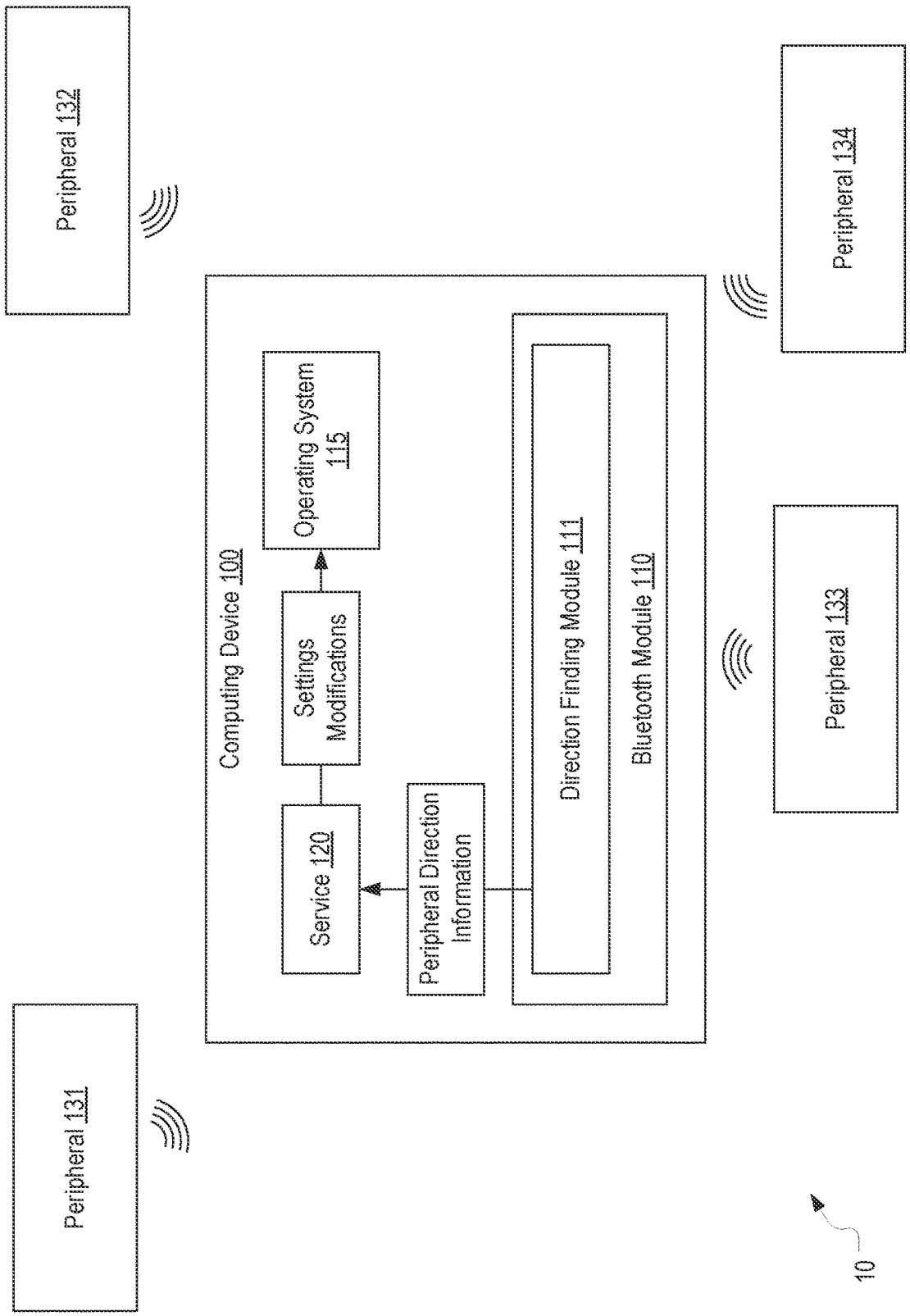
FIG. 1 illustrates an example computing environment in which embodiments of the present invention may be implemented.

FIG. 1 illustrates an example computing environment 10 in which embodiments of the present invention could be implemented. FIG. 1 also represents components that could be included on a computing device 100 to enable computing device 100 to implement one or more embodiments of the present invention. As shown, computing device 100 can include a Bluetooth module 110 which can represent components that enable computing device 100 to communicate via Bluetooth. Among other components, Bluetooth module 110 can include a direction finding module 111. Direction finding module 111 can represent any circuitry and/or functionality that is configured to generate "peripheral direction information" based on Bluetooth signals received from and/or transmitted to peripherals with which computing device 100 may be connected or within range. For example, FIG. 1 shows peripherals 131-134 transmitting Bluetooth signals from which direction finding module 111 may generate peripheral direction information. This peripheral direction information could be in any suitable form and can define the direction of each peripheral's location from computing device 100 (i.e., each peripheral's location relative to computing device 100). Examples of peripherals include a mouse (or trackpad), a keyboard, a monitor or other display, etc.

Computing device 100 may also include a service 120 that is configured to receive the peripheral direction information and use it to determine modifications that should be made to one or more settings pertaining to or associated with one or more corresponding peripherals. At least some of these settings could be maintained by operating system 115, but some settings could be maintained by other components on computing device 100. How a particular setting is maintained on computing device 100 is not essential to embodiments of the present invention. Of importance is that service 120 can modify the settings in some manner. Examples of settings include mouse settings, keyboard settings, display settings, etc.

Figure 2:
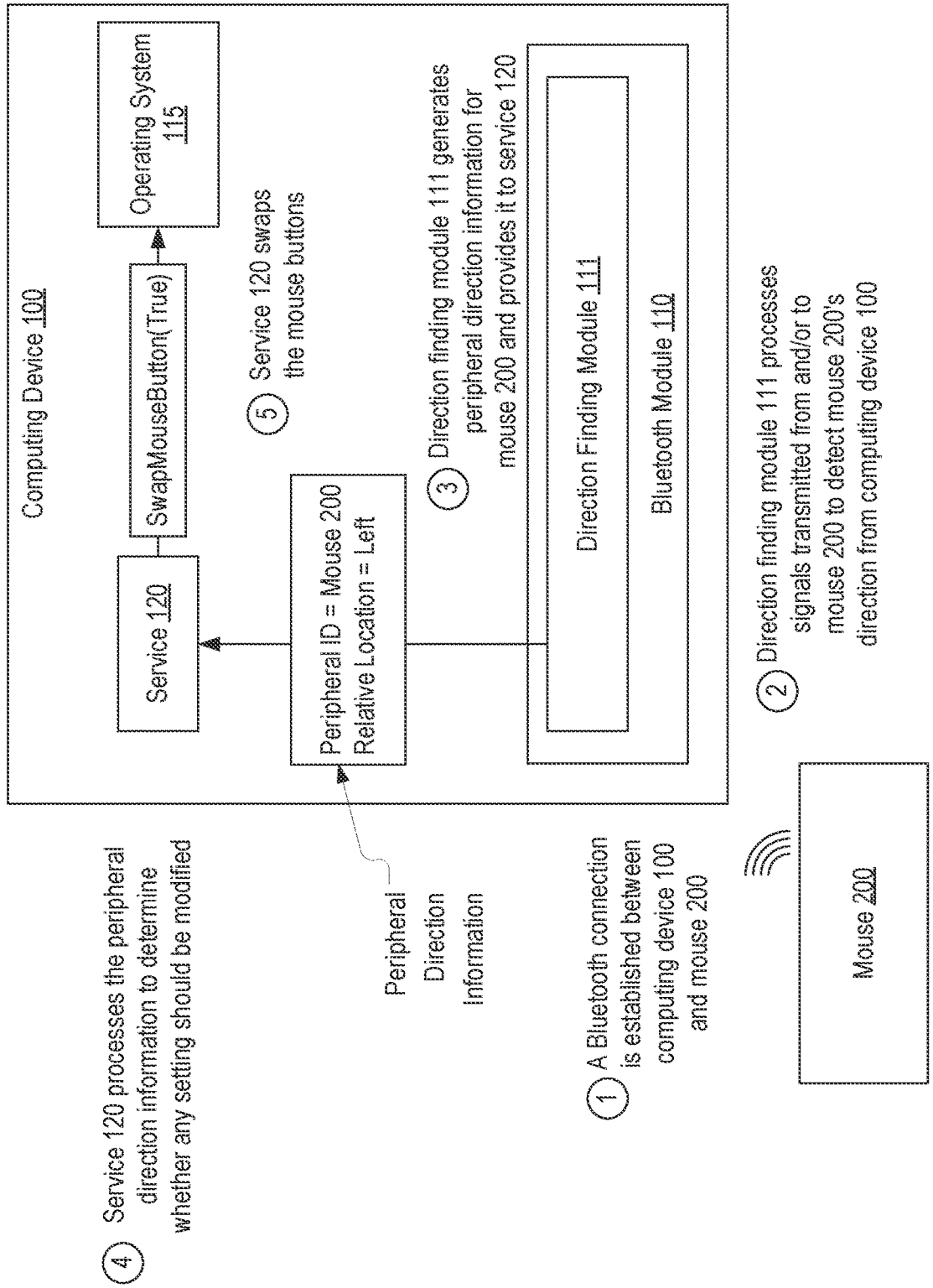
FIG. 2 provides an example of how mouse settings can be automatically configured based on a location of a mouse relative to a computing device in accordance with one or more embodiments of the present invention.

FIG. 2 provides an example of how service 120 may automatically configure mouse settings based on a detected location of a mouse 200 relative to computing device 100. In step 1, it is assumed that a Bluetooth connection is established between computing device 100 and mouse 200. In step 2, direction finding module 111 processes Bluetooth signals transmitted from and/or to mouse 200 to detect mouse 200's direction from computing device 100 (e.g., using angle of arrival techniques). In the depicted example and for simplicity, it can be assumed that direction finding module 111 determines that mouse 200 is located to the left of computing device 100. However, in implementations, direction finding module 111 could determine an angle, coordinates or other specific representation of mouse 200's relative location.

In step 3, direction finding module 111 can generate peripheral direction information for mouse 200 and provide the peripheral direction information to service 120. In the depicted example and again for simplicity, the peripheral direction information is represented as defining a peripheral ID of "mouse 200" and a relative location of "left." However, in implementations, the peripheral direction information could include any number of identifiers or other information for identifying the particular peripheral to which the peripheral direction information pertains and any suitable direction information from which the peripheral's relative location could be determined.

In step 4, service 120 can process the peripheral direction information it receives from direction finding module 111 to determine whether any setting should be modified. In this example, service 120 could determine from the peripheral direction information that mouse 200 is located to the left of computing device 100 while the current mouse settings on computing device 100 represent a right-hand mouse (which is typically the default setting). Accordingly, service 120 could determine that the mouse settings should be modified to cause mouse 200 to be a left-hand mouse. Notably, in some embodiments, service 120 could query operating system 115 (or another component) to determine the current state of settings prior to or in conjunction with step 4.

In step 5, and in response to the determination in step 4, service 120 can automatically configure the mouse settings based on the detected location of mouse 200 relative to computing device 100. For example, because service 120 has determined that mouse 200 is located to the left of computing device 100 but the current mouse settings cause mouse 200 to be treated as a right-hand mouse, service 120 could interface with operating system 115 to automatically cause mouse 200 to be treated as a left-hand mouse such as by calling the SwapMouseButton function with a value of True. As a result of step 5, the functions of the left and right buttons on mouse 200 will be automatically swapped. In this way, service 120 can automatically configure mouse 200 for a left-handed user of computing device 100 by merely requiring the left-handed user to position mouse 200 where he or she would normally position it during use.

Steps 2-4 could be repeated as mouse 200 is used with computing device 100 so that service 120 may immediately detect whenever the mouse settings should be modified. For example, after service 120 configures the mouse settings to cause mouse 200 to function in left-handed mode, a right-handed user may began using computing device 100 and may move mouse 200 to the right of computing device 100. In such a case, service 120 could detect, from the resulting peripheral direction information that direction finding module 111 may provide, that mouse 200 is located to the right of computing device 100. In response, service 120 could modify the mouse settings to return them to their default right-handed state (e.g., by calling SwapMouseButton (False)).

Figure 3:
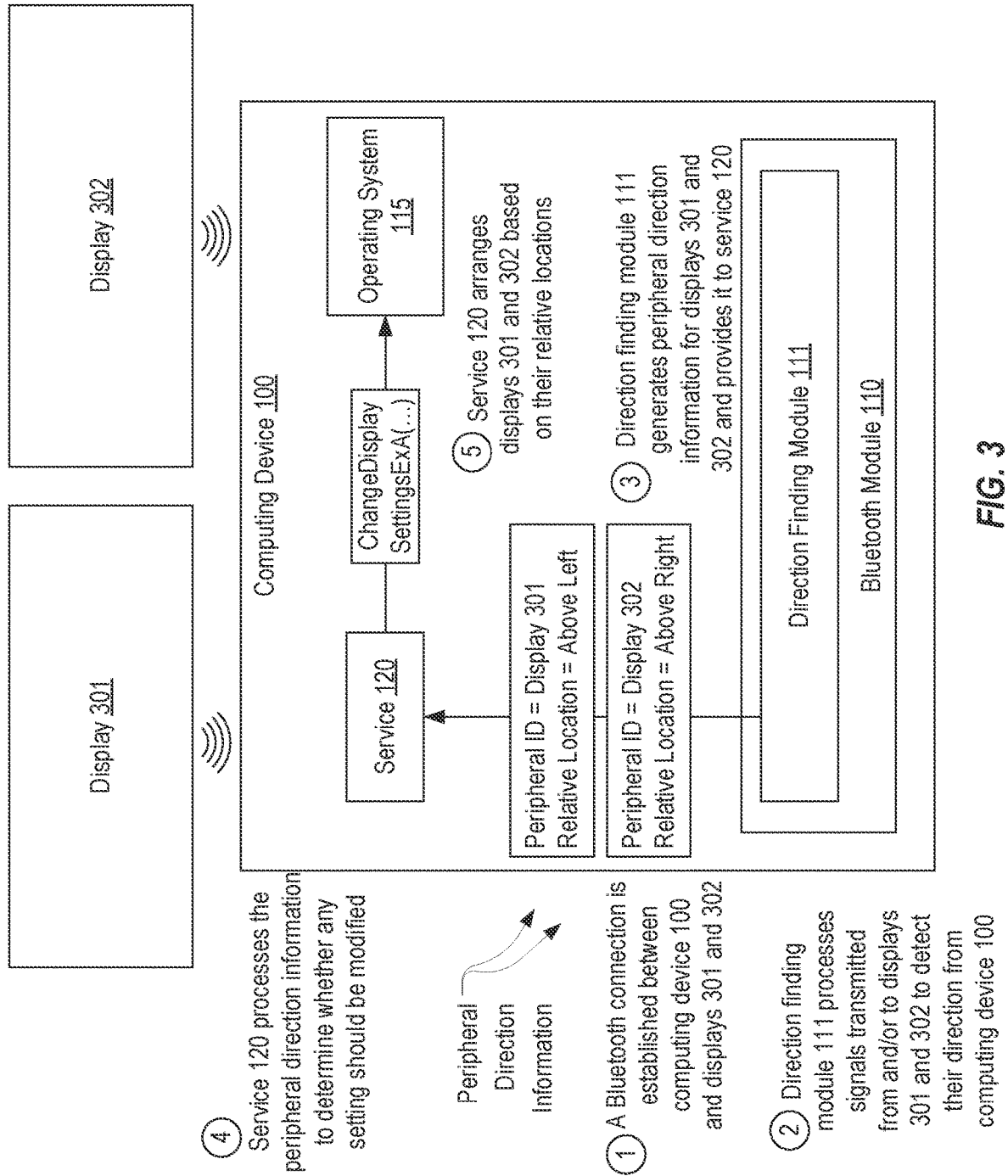
FIG. 3 provides an example of how display settings can be automatically configured based on locations of displays relative to a computing device in accordance with one or more embodiments of the present invention.

FIG. 3 provides an example of how service 120 may automatically configure display settings based on the detected locations of displays 301 and 302 relative to computing device 100. In this example, steps 1-3 can be the same as above expect that direction finding module 111 will provide peripheral direction information for both displays 301 and 302. For simplicity, it is assumed that the peripheral direction information defines display 301's relative location as "above left" and display 302's relative location as "above right."

In step 4, service 120 can process the peripheral direction information for displays 301 and 302 and determine whether any settings should be modified. For example, the current display settings may cause the display to be duplicated on display 301 and display 302 (and possibly on an internal display), and in such a case, service 120 could determine that the displays should be extended (e.g., based on determining that displays 301 and 302 are located side-by-side relative to computing device 100). Also, if an internal display is currently active (e.g., when computing device 100 is a laptop that is open), service 120 could determine how displays 301 and 302 should be positioned relative to the internal display (e.g., by determining that display 301 should be positioned above and offset to the left of the internal display and that display 302 should be positioned above and offset to the right of the internal display). Accordingly, in the context of displays, service 120 could determine, based on the detected locations of the display(s), modifications to the display settings controlling logical positioning of the displays and/or display settings controlling whether a particular display is duplicated, extended, turned off, the main display, landscape or portrait oriented, etc.

In step 5, and in response to the determination in step 4, service 120 can automatically configure the display settings based on the detected location of display 301 and/or display 302 relative to computing device 100. For example, service 120 could call the ChangeDisplaySettingsExA function to specify the logical positions of display 301, display 302 and possibly an internal display based on the displays' locations determined from the peripheral direction information.

As stated above, steps 2-4 could be repeated as displays 301 and/or 302 remain connected to computing device 100 to determine whether any modifications should be made to the display settings. For example, if the user moved computing device 100 relative to displays 301 and 302, service 120 could detect the new locations of displays 301 and 302 relative to computing device 100 and automatically adjust the logical positions of displays 301 and 302 relative to the logical position of an internal display. Similarly, if the user moved one or both of displays 301 and 302, service 120 could detect the new location(s) and automatically adjust the logical positions accordingly.

Although step 1 is represented as being performed before steps 2-4 in the above-described examples, it could be performed subsequent to any or all of these steps. For example, in some embodiments, a Bluetooth connection may be established with a peripheral after service 120 receives and processes peripheral direction information pertaining to the peripheral. In some embodiments, the Bluetooth connection could be established in response to the processing of the peripheral direction information.

For example, with reference to FIG. 2, another computing device could be positioned near computing device 100 while mouse 200 is connected to computing device 100. In such a case, an instance of service 120 running on each computing device could receive and process peripheral direction information pertaining to mouse 200 (and possibly pertaining to the other computing device). If mouse 200 were positioned nearer to the other computing device, the instance of service 120 running on the other computing device could determine, from the peripheral direction information, that mouse 200 should be connected to the other computing device rather than to computing device 100, and in response, could cause the connection to be made while also implementing step 5 to automatically configure the mouse settings on the other computing device to cause mouse 200 to operate in left-hand mode. A similar process could be performed when multiple computing devices are positioned near a display device or keyboard. In this way, service 120 can be configured to automatically connect a peripheral to the respective computing device based on the relative location of the peripheral determined from the peripheral direction information (e.g., to imitate a KVM switch).

In some embodiments, service 120 may be configured to automatically adjust display settings in response to a user's interactions with other peripherals. For example, if displays 301 and 302 were duplicated (or if an internal display and any external display is duplicated), service 120 could monitor the position of a mouse cursor to detect when the mouse cursor leaves the edge of the screen that is adjacent the other display (e.g., when the cursor is at the right edge of display 301 when display 302 is positioned to the right). In such a case, service 120 could automatically (or with consent) modify the display settings to extend displays 301 and 302. In other words, service 120 could interpret the user's movement of the cursor to the edge of the screen as an attempt to move the cursor to the adjacent display as if it were an extended display.

In summary, service 120 can leverage peripheral direction information that direction finding module 111 provides to determine the relative location of peripherals or other computing devices and use such relative locations to automatically configure settings of the computing device. These techniques can be used to automatically configure a user's workspace and may be particularly beneficial when multiple users may use the same workspace.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for automatically configuring settings of a first computing device based on a detected location of one or more peripherals, the method comprising:
   receiving, at a service executing on the first computing device, peripheral direction information from a first peripheral that is connected to a second computing device but not to the first computing device;
   processing the peripheral direction information to identify a first peripheral and a location of the first peripheral relative to the first computing device;
   based on the location of the first peripheral relative to the first computing device, establishing a connection between the first peripheral and the first computing device;
   based on the location of the first peripheral relative to the first computing device, automatically modifying one or more settings of the first computing device that pertain to the first peripheral.

2. The method of claim 1, wherein the peripheral direction information is generated from Bluetooth signals transmitted from or to the first peripheral.

3. The method of claim 1, wherein the one or more settings include one or more mouse settings.

4. The method of claim 1, wherein the one or more settings include one or more display settings.

5. The method of claim 1, wherein the first peripheral is a mouse and automatically modifying one or more settings of the first computing device that pertain to the first peripheral comprises modifying a function of one or more buttons of the mouse.

6. The method of claim 1, wherein the first peripheral is a display and automatically modifying one or more settings of the first computing device that pertain to the first peripheral comprises modifying a logical position of the display.

7. The method of claim 1, wherein the first peripheral is a display and automatically modifying one or more settings of the first computing device that pertain to the first peripheral comprises extending or duplicating the display.

8. The method of claim 1, further comprising:
processing the peripheral direction information to identify a second peripheral and a location of the second peripheral relative to the first computing device; and
based on the locations of the first and second peripherals relative to the first computing device, automatically modifying one or more settings of the first computing device that pertain to the first and second peripherals.

9. The method of claim 8, wherein the first peripheral is a first display and the second peripheral is a second display, and wherein automatically modifying one or more settings of the first computing device that pertain to the first and second peripherals comprises modifying logical positions of the first and second displays.

10. The method of claim 8, wherein the first peripheral is a first display and the second peripheral is a second display, and wherein automatically modifying one or more settings of the first computing device that pertain to the first and second peripherals comprises extending the first and second displays.

11. The method of claim 10, wherein the first and second displays are extended in response to detecting a position of a mouse cursor at an edge of the first display.

12. One or more computer storage media storing computer executable instructions which when executed implement a method for automatically configuring settings of a first computing device based on a detected location of one or more peripherals, the method comprising:
processing peripheral direction information that was generated based on Bluetooth signals transmitted from or to a first peripheral to detect a location of the first peripheral relative to a first computing device, the first peripheral being connected to a second computing device but not to the first computing device;
based on the detected location of the first peripheral relative to the first computing device, establishing a connection between the first peripheral and the first computing device in conjunction with disconnecting the first peripheral from the second computing device; and
based on the detected location of the first peripheral relative to the first computing device, modifying one or more settings of the first computing device pertaining to the first peripheral.

13. The computer storage media of claim 12, wherein the first peripheral is a mouse and modifying one or more settings of the first computing device pertaining to the first peripheral comprises causing the mouse to function in a left-hand mode or a right-hand mode.

14. The computer storage media of claim 12, wherein the first peripheral is a display and modifying one or more settings of the first computing device pertaining to the first peripheral comprises defining a logical position of the display.

15. The computer storage media of claim 12, wherein the method further comprises:
in conjunction with processing the peripheral direction information, receiving second peripheral direction information from the second computing device; and
processing the second peripheral direction information to determine that the first peripheral is closer to the first computing device than the second computing device.

16. A method for automatically configuring settings of a first computing device based on a detected location of a plurality of peripherals, the method comprising:
receiving, at a service executing on the computing device, peripheral direction information pertaining to a plurality of peripherals that are not connected to the first computing device but are connected to a second computing device;
processing the peripheral direction information to identify a location of each of the plurality of peripherals relative to the first computing device;
based on the location of each of the plurality of peripherals relative to the first computing device, establishing a connection between the plurality of peripherals and the first computing device in conjunction with disconnecting the plurality of peripherals from the second computing device; and
based on the location of each of the plurality of peripherals relative to the first computing device, automatically modifying one or more settings of the first computing device.

17. The method of claim 16, wherein the plurality of peripherals include a mouse and at least one display.

18. The method of claim 16, further comprising:
processing additional peripheral direction information to identify a changed location of at least one of the plurality of peripherals relative to the first computing device;
based on the changed location of the at least one of the plurality of peripherals relative to the first computing device, automatically modifying one or more settings of the first computing device.

* * * * *